United States Patent
Kim et al.

(10) Patent No.: US 9,036,572 B2
(45) Date of Patent: May 19, 2015

(54) MEASUREMENT REPORTING METHOD AND DEVICE IN A WIRELESS COMMUNICATION SYSTEM

(75) Inventors: So Yeon Kim, Anyang-si (KR); Han Gyu Cho, Anyang-si (KR); Sung Ho Moon, Anyang-si (KR); Yeong Hyeon Kwon, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 108 days.

(21) Appl. No.: 13/377,152

(22) PCT Filed: Jun. 11, 2010

(86) PCT No.: PCT/KR2010/003764
§ 371 (c)(1),
(2), (4) Date: Feb. 17, 2012

(87) PCT Pub. No.: WO2010/143911
PCT Pub. Date: Dec. 16, 2010

(65) Prior Publication Data
US 2012/0155312 A1    Jun. 21, 2012

Related U.S. Application Data

(60) Provisional application No. 61/186,359, filed on Jun. 11, 2009.

(51) Int. Cl.
*H04W 4/00* (2009.01)
*H04W 24/10* (2009.01)

(52) U.S. Cl.
CPC .................... *H04W 24/10* (2013.01)

(58) Field of Classification Search
CPC ............ H04W 24/10; H04L 5/00; H04J 1/00
USPC .................... 370/252–254, 238, 336
See application file for complete search history.

(56) References Cited

U.S. PATENT DOCUMENTS

| | | | |
|---|---|---|---|
| 2008/0049636 A1 | 2/2008 | Kimura | |
| 2008/0182580 A1* | 7/2008 | Laroia et al. | 455/440 |
| 2009/0060081 A1* | 3/2009 | Zhang et al. | 375/267 |
| 2009/0061886 A1* | 3/2009 | Cozzo et al. | 455/450 |
| 2009/0130985 A1 | 5/2009 | Lee et al. | |
| 2009/0202010 A1* | 8/2009 | Fu et al. | 375/260 |
| 2009/0268647 A1* | 10/2009 | Uejima | 370/297 |
| 2010/0303039 A1* | 12/2010 | Zhang et al. | 370/331 |
| 2010/0323688 A1* | 12/2010 | Kazmi et al. | 455/424 |
| 2011/0294491 A1* | 12/2011 | Fong et al. | 455/422.1 |
| 2012/0008524 A1* | 1/2012 | Amirijoo et al. | 370/252 |
| 2013/0028231 A1* | 1/2013 | Zhang et al. | 370/329 |

FOREIGN PATENT DOCUMENTS

| | | | |
|---|---|---|---|
| KR | 2008-0096351 A | 10/2008 | |
| KR | 10-2009-0017389 A | 2/2009 | |

* cited by examiner

*Primary Examiner* — Chandrahas Patel
*Assistant Examiner* — Lan Huong Truong
(74) *Attorney, Agent, or Firm* — McKenna Long & Aldridge LLP

(57) ABSTRACT

Provided are a measurement reporting method and device in a wireless communications system. A mobile station receives data relating to a measurement set for K (M≤N) component carriers to be measured from among N component carriers, from a base station. The mobile station measures the K component carriers. The mobile station then reports the results of the measurement of the K component carriers to the base station.

7 Claims, 10 Drawing Sheets

MEASUREMENT REPORTING METHOD AND DEVICE IN A WIRELESS COMMUNICATION SYSTEM

This application is a 35 U.S.C. §371 national stage entry of International Application No. PCT/KR2010/00374, and claims priority from U.S. Provisional Application No. 61/186,359, filed Jun. 11, 2009, the entire contents of which are hereby incorporated by reference for all purposes as if set forth herein.

TECHNICAL FIELD

The present invention relates to wireless communication and, more particularly, to a method and apparatus for reporting a measurement result in a wireless communication system.

BACKGROUND ART

3rd Generation Partnership Project (3GPP) Long Term Evolution (LTE) (i.e., the improvement of a Universal Mobile Telecommunications System (UMTS)) is introduced as 3GPP release 8. 3GPP LTE uses Orthogonal Frequency Division Multiple Access (OFDMA) in downlink and uses Single Carrier-Frequency Division Multiple Access (SC-FDMA) in uplink. Multiple Input Multiple Output (MIMO) having a maximum of 4 antennas is adopted. Recently, a discussion on 3GPP LTE-Advanced (LTE-A) which is the evolution of 3GPP LTE is in progress.

Technology introduced in 3GPP LTE-A includes a carrier aggregation, a relay, etc. A 3GPP LTE system is a single carrier system that supports only one bandwidth (i.e., one component carrier) of {1.4, 3, 5, 10, 15, 20} MHz. However, LTE-A is introducing multiple carriers employing a carrier aggregation. A component carrier is defined by a center frequency and a bandwidth. A multiple carrier system uses a plurality of component carriers having a smaller bandwidth than the entire bandwidth.

A user equipment consistently performs measurement in order to maintain the quality of a radio link with a serving cell from which service is being provided. A cell or frequency that is the subject of measurement is called a measurement object, and a report configuration independently causing a report on a measurement result is associated with each measurement object. The user equipment performs measurement for measurement objects and, if report configurations are satisfied, reports measurement results to a base station.

In a multiple carrier system, if measurement results for a plurality of all component carriers are reported, a load for reports on the measurement results may be increased according to an increase in the number of component carriers. Furthermore, user equipment does not use all the component carriers according to the capability of the user equipment or a cell environment.

In a wireless communication system, there is a need for a scheme capable of more efficiently reporting measurement results for a plurality of component carriers.

DISCLOSURE

Technical Problem

The present invention provides a method and apparatus for reporting a measurement result for a plurality of component carriers in a wireless communication system.

The present invention provides a method and apparatus for configuring measurement for a plurality of component carriers in a wireless communication system.

Technical Solution

In an aspect, a method of reporting a measurement in a wireless communication system is provided. The method includes receiving, by a user equipment, information about a measurement set of K (M≤N) component carriers on which measurement is performed, from among N component carriers, from a base station, performing, by the user equipment, measurement on the K component carriers, and reporting, by a user equipment, a measurement result for the K component carriers to the base station.

The K component carriers may not overlap with component carriers assigned to the user equipment.

The K component carriers may not overlap with active component carriers among component carriers assigned to the user equipment.

The information about the measurement set may be received in response to a request for a change of the measurement set of the user equipment.

In another aspect, a user equipment for reporting a measurement in a wireless communication system includes a measurement unit configured to perform measurement on K (M≤N) component carriers based on information about a measurement set of the K component carriers on which measurement is performed, from among N component carriers, and a transceiver configured to receive the information about the measurement set from a base station and transmit a measurement result of the K component carriers to the base station.

Advantageous Effects

In order to perform measurement for multiple carriers and report a measurement result, compatibility with the legacy system can be maintained and the battery consumption of user equipment can be reduced.

MODE FOR INVENTION

A User Equipment (UE) may be fixed or mobile and also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

A Base Station (BS) commonly refers to a fixed station communicating with UEs, and it may be called another terminology, such as an evolved NodeB (eNB), a Base Transceiver System (BTS), or an access point.

Each BS provides communication service to a specific geographical area (commonly called a cell). The cell may be classified into a plurality of areas (called sectors).

Hereinafter, downlink (DL) means communication from a BS to UE, and uplink (UL) means communication from UE to a BS. In downlink, a transmitter may be part of a BS, and a receiver may be part of UE. In uplink, a transmitter may be part of UE, and a receiver may be part of a BS.

Figure 1:
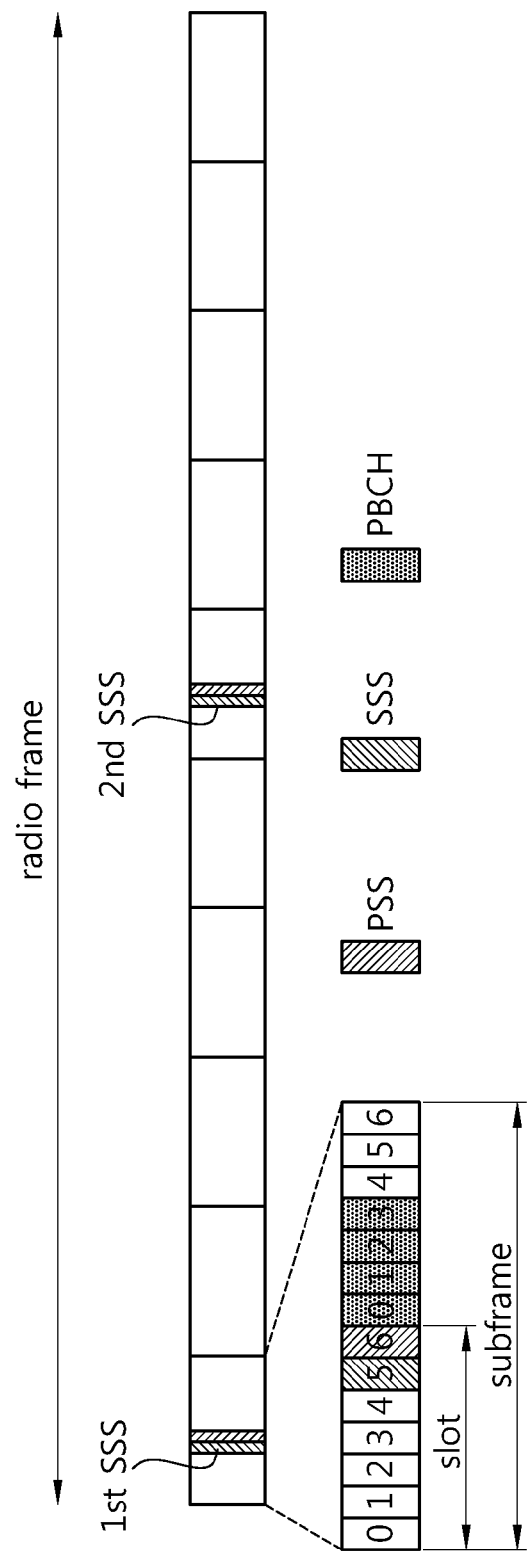
FIG. 1 shows the structure of a radio frame in 3GPP LTE.

FIG. 1 is a diagram showing the structure of a radio frame in 3GPP LTE. For the structure of the radio frame, reference may be made to Paragraph 6 of 3GPP TS 36.211 V8.7.0 (2009-05) "Evolved Universal Terrestrial Radio Access (E-UTRA); Physical Channels and Modulation (Release 8)". The radio frame includes 10 subframes to which respective indices 0 to 9 are assigned, and one subframe includes two slots. The time that one subframe is taken to be transmitted is called a Transmission Time Interval (TTI). For example, the length of one subframe may be 1 ms, and the length of one slot may be 0.5 ms.

One slot may include a plurality of Orthogonal Frequency Division Multiplexing (OFDM) symbols in the time domain. The OFDM symbol is only for representing one symbol period in the time domain because 3GPP LTE uses Orthogonal Frequency Division Multiple Access (OFDMA) in downlink and is not restricted to a multiple access method or a name. For example, the OFDM symbol may be called another name, such as a Single Carrier Frequency Division Multiple Access (SC-FDMA) symbol or a symbol period.

Although one slot has been illustrated to include 7 OFDM symbols, the number of OFDM symbols included in one slot may be changed depending on the length of a Cyclic Prefix (CP). In accordance with 3GPP TS 36.211 V8.7.0 (2009-05), one subframe includes 7 OFDM symbols in a normal CP and includes 6 OFDM symbols in an extended CP.

A Primary Synchronization Signal (PSS) is transmitted in the last OFDM symbols of a first slot (the first slot of a first subframe (a subframe having an index 0) and an eleventh slot (the first slot of a sixth subframe (a subframe having an index 5). The PSS is used to obtain OFDM symbol synchronization or slot synchronization and is associated with a physical cell identity (ID). A Primary Synchronization Code (PSC) is a sequence used in the PSS, and 3GPP LTE includes three PSCs. One of the three PSCs is transmitted as the PSS according to a cell ID. The same PSC is used in the last OFDM symbols of the first slot and the eleventh slot.

A Secondary Synchronization Signal (SSS) includes a first SSS and a second SSS. The first SSS and the second SSS are transmitted in OFDM symbols neighboring OFDM symbols in which PSSs are transmitted. The SSS is used to acquire frame synchronization. The SSS, together with the PSS, is used to acquire a cell ID. The first SSS and the second SSS use different Secondary Synchronization Codes (SSCs). Assuming that each of the first SSS and the second SSS includes 31 subcarriers, sequences of two SSCs, each having a length of 31, are used in the first SSS and the second SSS, respectively.

A Physical Broadcast Channel (PBCH) is transmitted in four former OFDM symbols of the second slot of a first subframe. The PBCH carries system information that is indispensably required for UE to communicate with a BS. System information transmitted through the PBCH is called a Master Information Block (MIB). Meanwhile, system information transmitted through a Physical Downlink Shared Channel (PDSCH) indicated by a Physical Downlink Control Channel (PDCCH) is called a System Information Block (SIB).

As disclosed in 3GPP TS 36.211 V8.7.0 (2009-05), in LTE, a physical channel may be divided into data channels, such as a Physical Downlink Shared Channel (PDSCH) and a Physical Uplink Shared Channel (PUSCH) and control channels, such as a Physical Downlink Control Channel (PDCCH), a Physical Control Format Indicator Channel (PCFICH), a Physical Hybrid-ARQ Indicator Channel (PHICH), and a Physical Uplink Control Channel (PUCCH).

Figure 2:
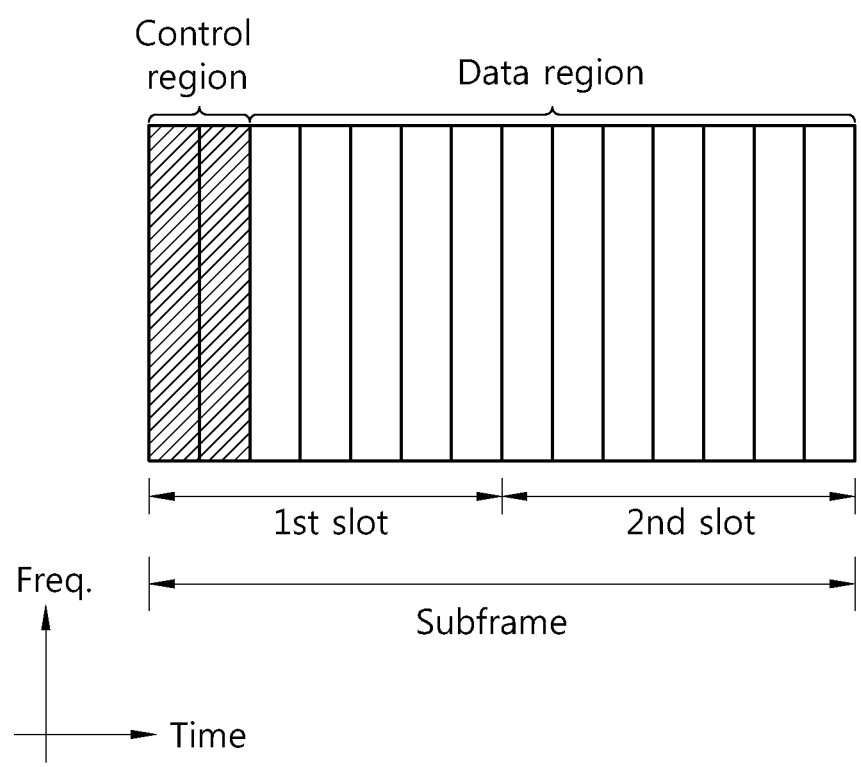
FIG. 2 shows the structure of a downlink subframe in 3GPP LTE.

FIG. 2 shows the structure of a downlink subframe in 3GPP LTE. The subframe is divided into a control region and a data region in the time domain. The control region includes a maximum of 3 OFDM symbols in the former of a first slot within the subframe, but the number of OFDM symbols included in the control region may be changed. PDCCHs are assigned to the control region, and PDSCHs are assigned to the data region.

A Resource Block (RB) is a resource assignment unit, and it includes a plurality of subcarriers in one slot. For example, if one slot includes 7 OFDM symbols in the time domain and the RB includes 12 subcarriers in the frequency domain, one RB may include 7×12 Resource Elements (REs).

A PCFICH transmitted in the first OFDM symbol of the subframe carries a Control Format Indicator (CFI) about the number of OFDM symbols (i.e., the size of the control region) which is used to transmit control channels within the subframe. UE first receives the CFI on the PCFICH and then monitors PDCCHs.

A PHICH carries positive-acknowledgement (ACK)/negative-acknowledgement (NACK) signals for an uplink Hybrid Automatic Repeat Request (HARQ). ACK/NACK signals for uplink data transmitted by UE are transmitted on the PHICH.

Control information transmitted through a PDCCH is called Downlink Control Information (DCI). The DCI may include the resource assignment (hereinafter also referred to as a 'downlink grant') of a PDSCH, the resource assignment (hereinafter also referred to as an 'UL grant') of a PUSCH, a set of transmission power control commands for individual UEs within a specific UE group and/or the activation of a Voice over Internet Protocol (VoIP).

As described in Paragraph 9 of 3GPP TS 36.213 V8.7.0 (2009-05), blind decoding is used to detect a PDCCH. Blind decoding uses a method of checking the owner or use of a PDCCH by demasking a specific identifier in the Cyclic Redundancy Check (CRC) of a received PDCCH (hereinafter referred to as a 'PDCCH candidate') and checking a CRC error. UE monitors one or more PDCCHs for every subframe. Here, the monitoring means that UE attempts the decoding of the PDCCHs according to a monitored PDCCH format.

Measurement is described below.

In a mobile communication system, the mobility of UE is essential. Accordingly, the UE consistently measures quality for a serving cell that now provides service and quality for neighboring cells. The UE reports a measurement result to a network on a proper time, and the network provides optimal mobility to the UE through handover, etc.

If a specific area having a very poor quality is detected through measurement while UE is moving, the UE may report position information about cells having a poor quality and measurement results to a network. The network may attempt to optimize its network based on reports on the measurement results of UEs which help the operation of the network.

The mobility of UE is chiefly performed between different cells in the same frequency band. Accordingly, the UE must be able to well measure the quality of neighboring cells having the same center frequency as a serving cell and information about the cells. Measurement for a cell having the same center frequency as a serving cell is called intra-frequency measurement. UE has to be able to perform intra-frequency measurement and report a measurement result to a network on a proper time so that the object of the measurement result can be achieved.

A mobile communication service provider may operate a network by using a plurality of frequency bands. If the service of a communication system is provided through a plurality of frequency bands, the UE must be able to well measure the quality of neighboring cells having a different center frequency from a serving cell and information about the cells in order to guarantee an optimal mobility for UE. As described above, measurement for a cell having a different center frequency from the serving cell is called inter-frequency measurement. UE has to be able to perform inter-frequency measurement and report a measurement result to a network on a proper time.

If UE supports measurement for a heterogeneous network, measurement for the cells of the heterogeneous network may also be performed according to a BS configuration. The measurement for the heterogeneous network is called inter-Radio Access Technology (RAT) measurement. For example, RAT may include a UMTS Terrestrial Radio Access Network (UTRAN) according to the 3GPP standard, an Evolved-UTRAN (E-UTRAN), and a GSM EDGE Radio Access Network (GERAN) and may also include a CDMA 2000 system according to the 3GPP2 standard.

Figure 3:
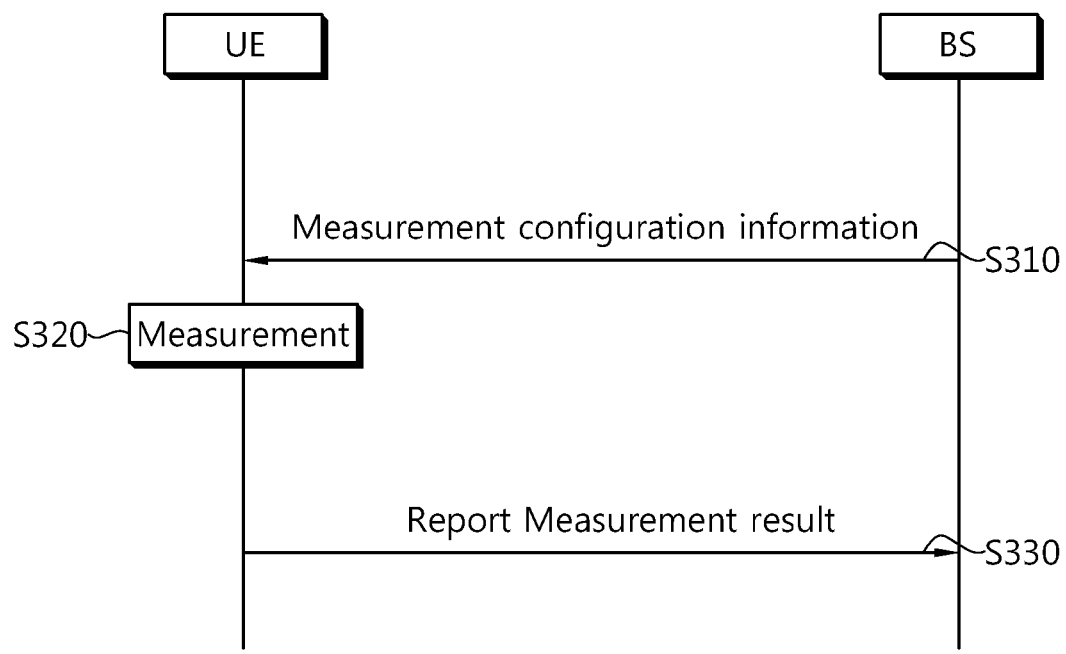
FIG. 3 is a flowchart showing the existing method of performing measurement.

FIG. 3 is a flowchart showing the existing method of performing measurement.

A UE receives measurement configuration information from a BS (S310). A message including the measurement configuration information is called a measurement configuration message.

The UE performs measurement on the basis of the measurement configuration information (S320).

If a measurement result satisfies a report condition within the measurement configuration information, the UE reports the measurement result to the BS (S330). A message including the measurement result is called a measurement report message.

The measurement configuration information may include the following pieces of information.

(1) A measurement object: information about the object to be measured by UE. The measurement object includes at least any one of an intra-frequency measurement object that is the object of intra-frequency measurement, an inter-frequency measurement object that is the object of inter-frequency measurement, and an inter-RAT measurement object that is the object of inter-RAT measurement. For example, the intra-frequency measurement object may indicate a neighboring cell having the same frequency band as a serving cell, the inter-frequency measurement object may indicate a neighboring cell having a different frequency band from a serving cell, and the inter-RAT measurement object may indicate a neighboring cell having different RAT from a serving cell.

(2) A report configuration: information about a report condition and a report type regarding when UE reports a measurement result. The report condition may include information about an event or cycle that triggers a report on a measurement result. The report type is information about how measurement result will be configured according to what type.

(3) A measurement identity: information about an identifier that enables UE to determine when and what measurement object will be reported according to what type by associating a measurement object and a report configuration.

(4) A quantity configuration: information about parameters for setting the filtering of a measurement unit, a reporting unit and/or a measurement result value.

(5) A measurement gap: information about a measurement gap that UE may use it for only measurement without data transmission to and from a serving cell into consideration because downlink transmission or uplink transmission is not scheduled.

Measurement metrics reported by UE as a measurement result include a Reference Signal Received Power (RSRP), a Received Signal Strength Indicator (RSSI), a Reference Signal Received Quality (RSRQ), etc. The RSRP is a cell-specific signal intensity metric. The RSSI is a total reception signal power received by UE. The RSRQ is a cell-specific signal quality metric. For the detailed contents of each of the measurement metrics, reference may be made to Paragraph 5 of 3GPP TS 36.214 V8.6.0 (2009-03).

A multiple carrier system is described below.

A 3GPP LTE system supports a case where a downlink bandwidth and an uplink bandwidth are differently set, but one Component Carrier (CC) is a precondition for the case. This means that, in the state where one CC is defined for each of downlink and uplink, 3GPP LTE supports only a case where the downlink bandwidth is identical with or different from the uplink bandwidth. For example, the 3GPP LTE system may support a maximum of 20 MHz and have different uplink bandwidth and downlink bandwidth, but supports only one CC in each of uplink and downlink.

A spectrum aggregation (also called a bandwidth aggregation or a carrier aggregation) supports a plurality of CCs. The spectrum aggregation is introduced in order to support an increased throughput, prevent an increase of costs due to the introduction of a broadband Radio Frequency (RF), and guarantee compatibility with the existing system. For example, if 5 CCs are assigned as the granularity of a carrier unit having a 20 MHz bandwidth, a maximum bandwidth of 100 MHz can be supported.

The spectrum aggregation may be divided into a contiguous spectrum aggregation in which an aggregation is performed between contiguous carriers and a non-contiguous spectrum aggregation in which an aggregation is performed between non-contiguous carriers, in the frequency domain. The number of CCs aggregated between downlink and uplink may be differently set. A case where the number of DL CCs is identical with the number of UL CCs is called a symmetric aggregation, and a case where the number of DL CCs is different from the number of UL CCs is called an asymmetric aggregation.

CCs may have different sizes (i.e., bandwidths). For example, assuming that 5 CCs are used to configure a 70 MHz bandwidth, the 70 MHz bandwidth may be configured using a 5 MHz carrier (CC #0)+a 20 MHz carrier (CC #1)+a 20 MHz carrier (CC #2)+a 20 MHz carrier (CC #3)+a 5 MHz carrier (CC #4).

Figure 4:
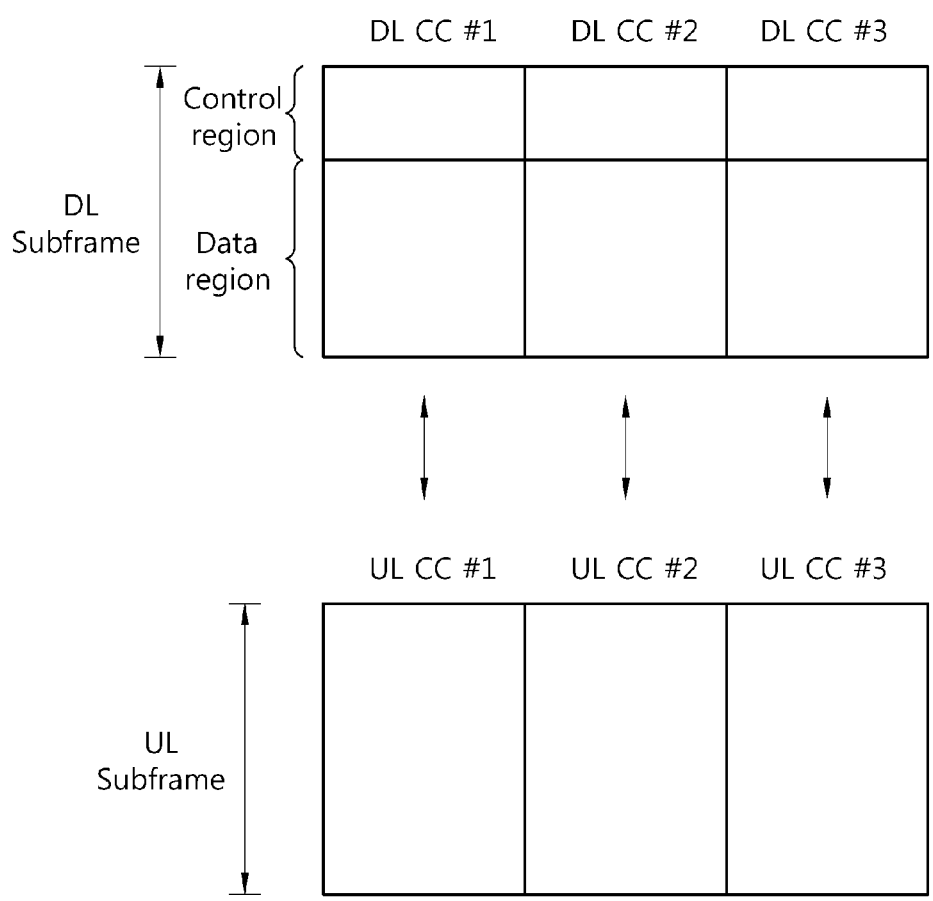
FIG. 4 shows an example of multiple carriers.

FIG. 4 shows an example of multiple carriers. Three DL CCs and three UL CCs are shown, but the number of DL CCs and the number of UL CCs are not limited. A PDCCH and a PDSCH are independently transmitted in each DL CC, and a PUCCH and a PUSCH are independently transmitted in each UL CC.

A multiple carrier system hereinafter refers to a system supporting multiple carriers on the basis of a spectrum aggregation. In a multiple carrier system, a contiguous spectrum aggregation and/or a non-contiguous spectrum aggregation may be used, and either a symmetric aggregation or an asymmetric aggregation may be used.

In a multiple carrier system, a linkage between a DL CC and a UL CC may be defined. The linkage may be configured based on E-UTRA Absolute Radio Frequency Channel Number (EARFCN) information included in downlink system information or may be configured using a fixed DL/UL Tx/Rx separation relationship. The linkage refers to a mapping relationship between a DL CC on which a PDCCH carrying an UL grant is transmitted and a UL CC using the UL grant. Alternatively, the linkage may refer to a mapping relationship between a DL CC (or a UL CC) on which data for an HARQ is transmitted and a UL CC (or a DL CC) on which HARQ ACK/NACK signals are transmitted. A BS may inform UE of the linkage information as a higher layer message, such as an RRC message, or part of system information. The linkage between a DL CC and a UL CC may be fixed, but may be changed between an inter-cell and UE.

In a multiple carrier system, CC scheduling includes two kinds of methods.

In the first method, a PDCCH-PDSCH pair is transmitted in one CC. This CC is called a self-scheduling CC. Furthermore, it means that a UL CC on which a PUSCH is transmitted becomes a CC linked to a DL CC on which a relevant PDCCH is transmitted. That is, PDSCH resources are assigned to the PDCCH on the same CC or PUSCH resources are assigned to the PDCCH on a linked UL CC.

In the second method, a DL CC on which a PDSCH is transmitted or a UL CC on which a PUSCH is transmitted is determined irrespective of a DL CC on which a PDCCH is transmitted. That is, a PDCCH and a PDSCH are transmitted on different DL CCs, or the PUSCH is transmitted on a UL CC not linked to a DL CC on which a PDCCH has been transmitted. This is called cross-carrier scheduling. The CC on which the PDCCH is transmitted is called a PDCCH carrier, a monitoring carrier, or a scheduling carrier, and the CCs on which the PDSCH/PUSCH are transmitted are called PDSCH/PUSCH carriers or scheduled carriers.

Cross-carrier scheduling may be activated or deactivated for every UE. UE having cross-carrier scheduling activated may receive DCI including a CIF. The UE may know that a PDCCH received from the CIF included in the DCI is control information about what scheduled CC.

A DL-UL linkage predefined by cross-carrier scheduling may be overridden. In other words, cross-carrier scheduling may be used to schedule another CC not a linked CC irrespective of a DL-UL linkage.

Figure 5:
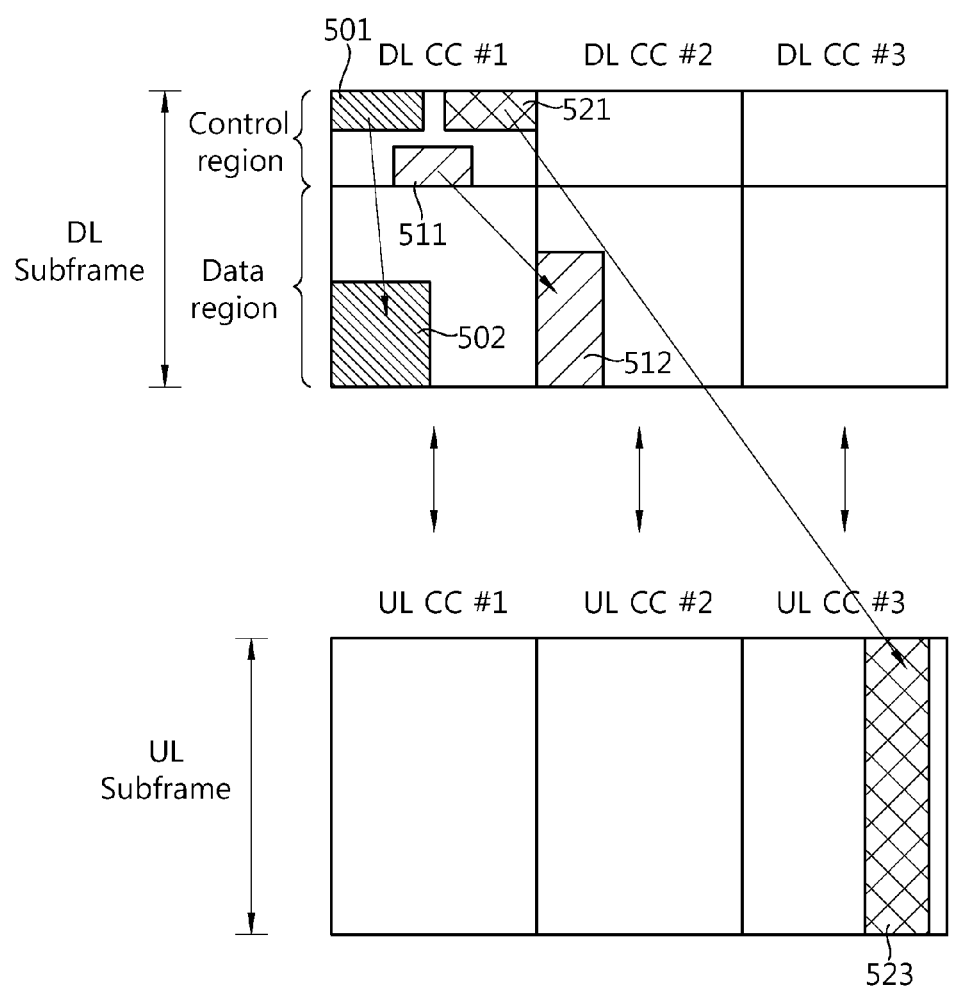
FIG. 5 shows an example of cross-carrier scheduling.

FIG. 5 shows an example of cross-carrier scheduling. It is assumed that a DL CC #1 and a UL CC #1 are linked together, a DL CC #2 and a UL CC #2 are linked together, and a DL CC #3 and a UL CC #3 are linked together.

The first PDCCH 501 of the DL CC #1 carries DCI for the PDSCH 502 of the same DL CC #1. The second PDCCH 511 of the DL CC #1 carries DCI for the PDSCH 512 of the DL CC #2. The third PDCCH 521 of the DL CC #1 carries DCI for the PUSCH 522 of the UL CC #3 not linked to the DL CC #1.

For cross-carrier scheduling, the DCI of a PDCCH may include a Carrier Indicator Field (CIF). The CIF indicates a DL CC or a UL CC that is scheduled through DCI. For example, the second PDCCH 511 may include a CIF indicating the DL CC #2. The third PDCCH 521 may include a CIF indicating the UL CC #3.

Figure 6:
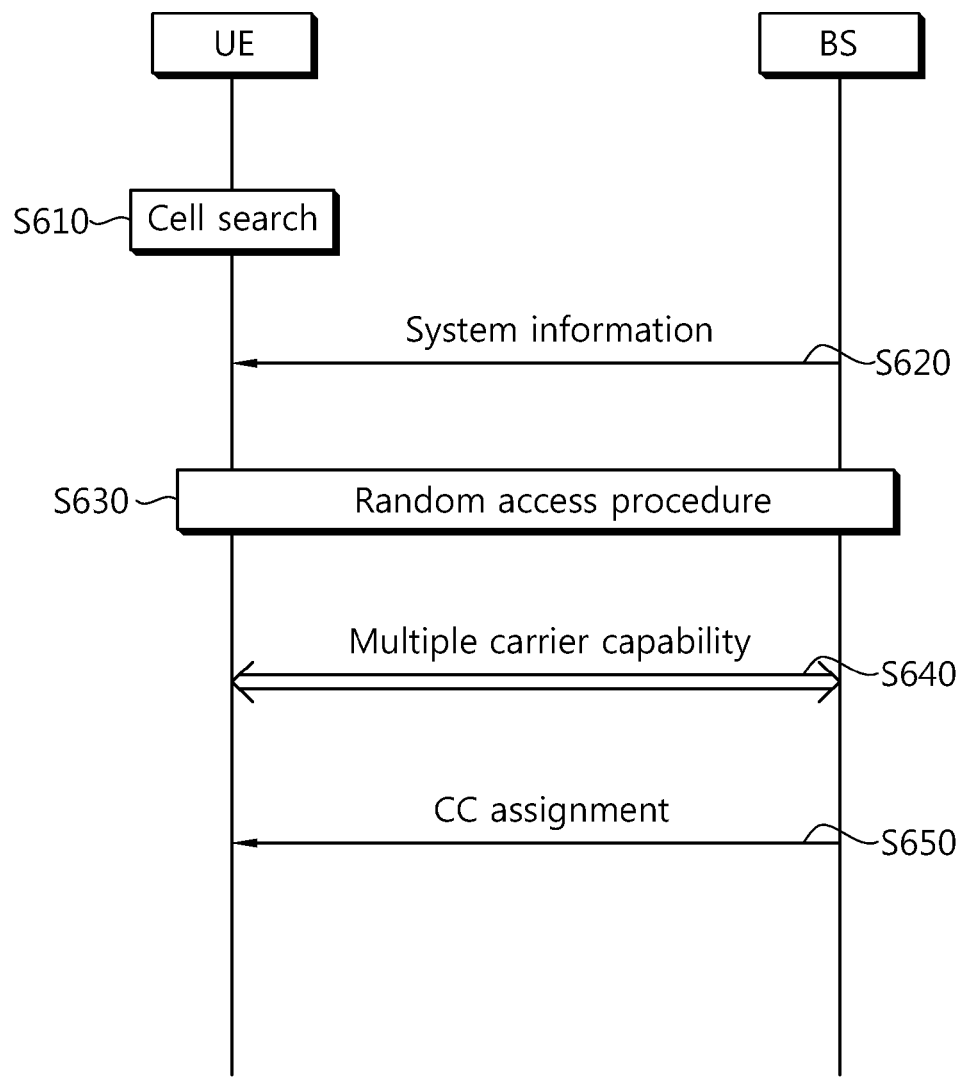
FIG. 6 shows an example of initial access in a multiple carrier system.

FIG. 6 shows an example of initial access in a multiple carrier system.

First, an UE detects a PSS and an SSS by performing cell search (S610). The PSS and the SSS may be detected in one of a plurality of DL CCs.

The UE receives system information from a BS (S620). The system information may be received through the CC through which the PSS and the SSS have been detected. The system information includes information about the number of transmission antennas of a BS, a PHICH configuration, a downlink bandwidth.

The UE performs a contention-based random access process along with the BS (S630). When the random access process is successfully completed, a Radio Resource Control (RRC) connection is established between the UE and the BS.

The BS and the UE exchanges multiple carrier capabilities (S640). The BS may send information about available CCs and linkage to the UE, and the UE may send information about DL CCs/UL CCs supportable by the UE to the BS. The BS may inform the UE of the information about available CC and linkage through system information.

The BS informs the UE of information about assigned CCs determined on the basis of the multiple carrier capabilities (S640). The BS sends information about active CCs activated (or deactivated), from among the assigned CCs, to the UE so that multiple carriers can be dynamically operated.

Figure 7:
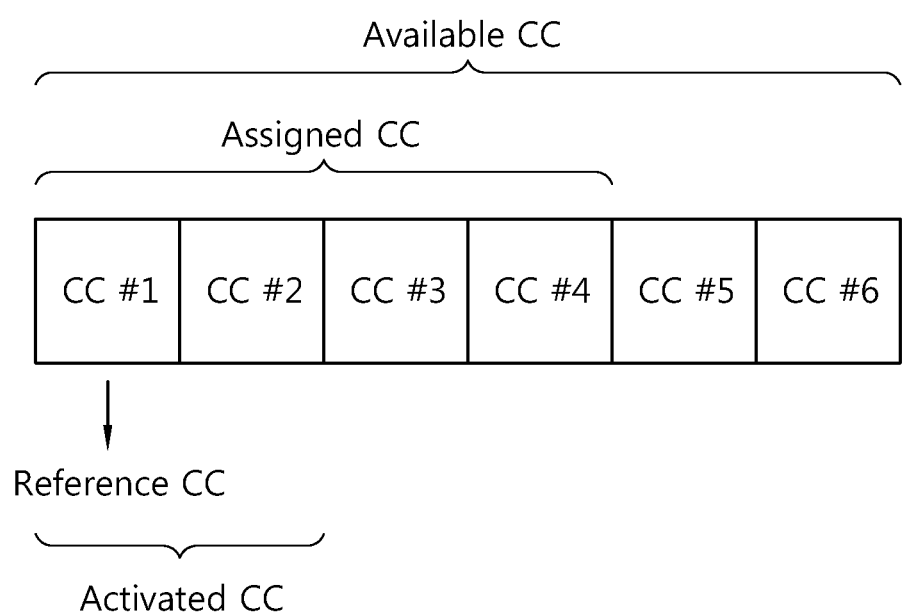
FIG. 7 shows an example of the operation of multiple carriers.

FIG. 7 shows an example of the operation of multiple carriers. Although a multiple carrier system supports a plurality of CCs, the number of supported CCs may vary according to a cell or UE capability.

Available CCs refer to all CCs available for a system (or a BS). Here, the available CCs include six CCs from a CC #1 to a CC #6.

Assigned CCs are CCs assigned to UE by a BS according to the capability of the UE, from among available CCs. The CC #1 to the CC #4 are shown to be assigned CCs, but the number of assigned CCs may be smaller than or equal to the number of available CCs.

An active CC (or activated CC) is a CC used for UE to receive and/or transmit a control signal and/or data to/from a BS. UE may perform PDCCH monitoring and/or PDSCH buffering for only an active CC. The active CC is activated or deactivated from assigned CCs. A CC which is always activated and whose important control information is transmitted, among active CCs, is referred to as a reference CC or a primary CC.

Figure 8:
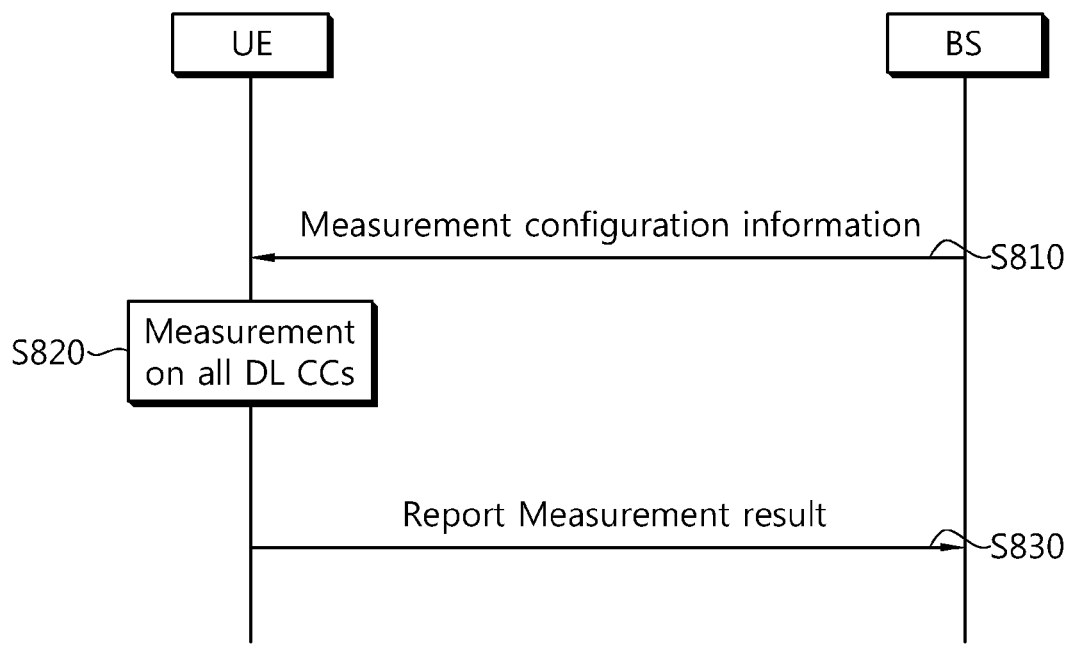
FIG. 8 is a flowchart showing a measurement report method according to an embodiment of the present invention.

FIG. 8 is a flowchart showing a measurement report method according to an embodiment of the present invention.

An UE receives measurement configuration information from a BS (S810). A message including the measurement configuration information is called a measurement configuration message. The measurement configuration information includes a measurement object, a report configuration, and a measurement identity.

The UE performs measurement for all available DL CCs on the basis of the measurement configuration information (S820). The measurement configuration information may include a report configuration for one or more DL CCs or may include one report configuration for all the DL CCs.

If a measurement result satisfies a report condition within the report configuration, the UE reports the measurement result to the BS (S830). A message including the measurement result is called a measurement report message.

Since the UE performs measurement for all the available DL CCs without additional signaling, a measurement configuration needs not to be additionally defined, and signaling overhead can be reduced.

If measurement results for all the DL CCs are included in one message, resources may be insufficient. Accordingly, the measurement results may be transmitted through a plurality of messages. For example, in an nth subframe, a first measurement report message including a measurement result for some of all the DL CCs may be sent. In an (n+k)th subframe, a second measurement report message including a measurement result for the remaining CCs may be transmitted.

Measurement is performed for all the DL CCs, but a report on a measurement result may be performed for only some CCs. For example, a measurement result for M CCs having the best measurement results, from among N available CCs, is reported. M≤N. M may be identically applied to all UEs within a cell or may be different set for every UE. M may have a value greater than the number of CCs supportable by UE. The measurement report message may include a measurement result for M CCs and a bitmap or index indicating the selected M CCs.

Figure 9:
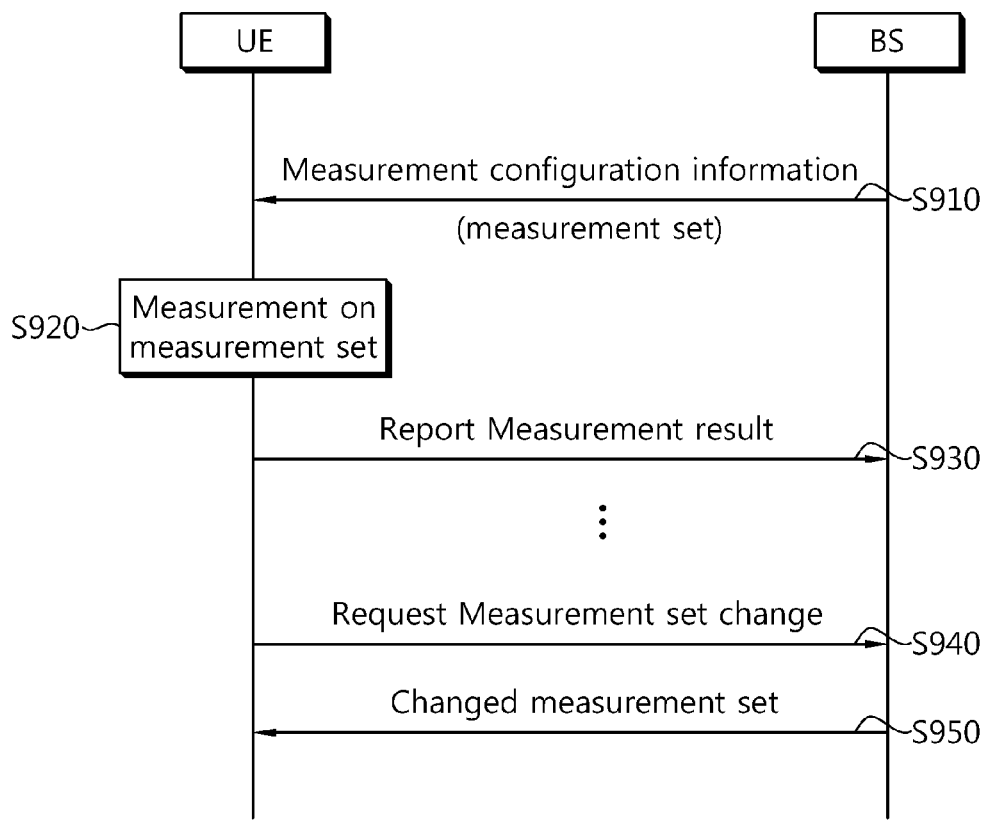
FIG. 9 is a flowchart showing a measurement report method according to another embodiment of the present invention.

FIG. 9 is a flowchart showing a measurement report method according to another embodiment of the present invention.

An UE receives measurement configuration information from a BS (S910). A message including the measurement configuration information is called a measurement configuration message. The measurement configuration information includes a report configuration and a measurement set indicating a set of CCs to be measured. The measurement set includes information about K(K≤N) component carriers on which measurement will be performed, from among N available CCs. The measurement configuration information may include a report configuration for one or more DL CCs within the measurement set or may include one report configuration for the measurement set.

The UE performs measurement for DL CCs belonging to the measurement set on the basis of the measurement configuration information (S920).

If a measurement result satisfies a report condition within the report configuration, the UE reports the measurement result to the BS (S930). A message including the measurement result is called a measurement report message.

The execution of measurement for all the DL CCs within a system may increase the complexity of UE and result in battery consumption due to the measurement. Accordingly, low complexity and low battery consumption can be achieved by limiting measurement to CCs within a measurement set.

The measurement set may be a white list that is a list of CCs on which measurement will be performed, or the measurement set may be a black list that is a list of CCs not the object of measurement. If a measurement set is a black list, UE performs measurement for CCs not belonging to the measurement set. A case where the measurement set is the white list is described below.

The measurement set may be cell-specific or UE-specific. In a cell-specific measurement set, the same one measurement set is used for UEs within a cell. In the UE-specific measurement set, a measurement set indicated for every UE is used.

The measurement set may be transmitted through an additional message not a measurement configuration message. For example, the measurement set may be transmitted along with carrier assignment information or carrier activation information.

Assuming that a set of available CCs is a cell CC set and a set of assigned CCs is a UE CC set, a measurement set may be a subset of the cell CC set. CCs belonging to the UE CC set and CCs belonging to the measurement set may partially overlap with each other or may be exclusive.

Regarding CCs belonging to a UE CC set, a measurement set and the UE CC set may be set so that they do not overlap with each other because UE reports a Channel Quality Indicator (CQI), measured through a Cell-specific Reference Signal (CRS), etc., to a BS. Alternatively, the measurement set may do not overlap with active CCs of the CCs within the UE CC set.

The measurement set may include one or more CCs not belonging to a UE CC set, from a cell CC set.

The measurement set may be changed at the request of UE or according to an instruction of a BS.

The UE transmits a request for a change of the measurement set to the BS (S940). In response to the request for the change, the BS transmits a changed measurement set to the UE (S950). The changed measurement set may be included in measurement configuration information and transmitted through a measurement configuration message or may be transmitted through an additional message.

UE may request a change of a measurement set as in the following cases. (1) When the transmission quality of CCs belonging to a UE CC set used by the UE is deteriorated, (2) when additional CCs need to be assigned because a transmission rate desired by the UE is not achieved using a UE CC set now assigned to the UE, and (3) when the UE is required to measure the CCs of neighboring cells for handover, etc.

A BS may instruct a change of a measurement set as in the following cases. (1) When it is necessary to distribute a load because the load is concentrated on a specific CC, (2) when a contiguous BS requests a change of a specific CC, and (3) when a failure is generated for a specific CC.

A measurement set may be semi-statically transmitted through an RRC message or may be dynamically transmitted through L1/L2 control signaling.

A measurement set may be transmitted in a relatively long cycle through an RRC message. Furthermore, a measurement set may be dynamically changed through L1/L2 control signaling.

A measurement set is transmitted in the control region of a subframe, but may be transmitted through a new control channel different from a PDCCH or a PCFICH. For example, the last r(r>1) CCEs, from among Control Channel Elements (CCEs) within a control region, may be used for the transmission of a transmission set. Alternatively, CCEs at designated positions, from among CCEs within a control region, may be used for the transmission of a transmission set.

A measurement set may be transmitted through a reference CC.

A measurement set may be included in DCI on a PDCCH and transmitted. A new DCI format for the measurement set may be defined, or a measurement set may be included in the existing DCI format. An identifier for identifying a measurement set may be masked in the CRC of DCI for the measurement set.

The PDCCH on which the measurement set is transmitted may be monitored in a common search space and/or UE-specific search When a measurement set is transmitted using a control channel, such as a PDCCH, a measurement CC may be dynamically designated, but signaling overhead may be caused. In order to mitigate such signaling overhead, the measurement set may be limited to and transmitted only in a specific subframe. For example, the measurement set may be limited to and transmitted only in a subframe in which a PSS and an SSS are transmitted, from a radio frame. Alternatively, a cycle where a PBCH is transmitted may not be for every subframe, such as a {0, 5} or {0, 3, 7}th subframe, but the measurement set may be transmitted in a specific cycle. A subframe cycle or configuration in which the measurement set is transmitted may be cell-specific or UE-specific.

A measurement set may be set to exceed a capability that may be supported by UE. For example, UE supports a maximum of 4 CCs, but the measurement set includes 8 CCs. In order to perform measurement for CCs exceeding UE capability, a CC measurement gap may be included in measurement configuration information.

With the introduction of an LTE-A system, a plurality of measurement targets may exist. That is, a Channel State Information (CSI) RS is being introduced by an LTE-A system in order to support a maximum of 8 transmission antennas in addition to a CRS used as a measurement target in the existing LTE system. Accordingly, a CSI RS may be utilized as the measurement target in addition to the CRS. An RS indicator, indicating what RS has been used for measurement, may be included in a measurement result because an antenna configuration is difference between the CRS and the CSI RS. Alternatively, a BS may inform UE of an RS indicator indicating what RS will be used for measurement.

A plurality of CCs may have the same cell ID. Alternatively, each of a plurality of CCs may have a unique cell ID.

Figure 10:
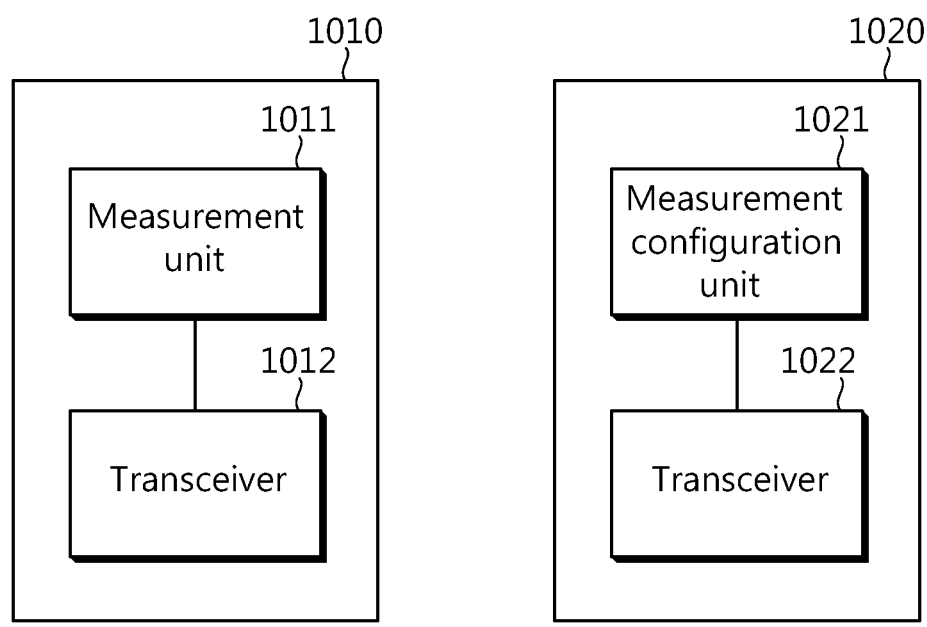
FIG. 10 is a block diagram showing wireless apparatuses in which the embodiments of the present invention are implemented.

FIG. 10 is a block diagram showing wireless apparatuses in which the embodiments of the present invention are implemented.

UE 1010 includes a measurement unit 1011 and a transceiver 1012. The measurement unit 1011 implements the measurement of UE in the embodiments of FIGS. 8 and 9, performs measurement for all DL CCs or CCs within a measurement set on the basis of measurement configuration information, and generates a measurement result. The transceiver 1012 receives measurement configuration information and sends the measurement result to a BS.

A BS 1020 includes a measurement configuration unit 1021 and a transceiver 1022. The measurement configuration unit 1021 supports multiple carriers and configures measurement configuration information to be transmitted to the measurement unit 1011 of the UE 1010. The transceiver 1022 transmits the measurement configuration information and receives the measurement result.

The measurement unit 1011 and the transceiver 1012 may be implemented by one processor. Furthermore, the measurement configuration unit 1021 and the transceiver 1022 may be implemented by one processor.

The processor may include Application-Specific Integrated Circuits (ASICs), other chipsets, logic circuits, and/or data processors. When the above-described embodiment is implemented in software, the above-described scheme may be implemented using a module (process or function) which performs the above function.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method of reporting a measurement in a wireless communication system, comprising:
    receiving, by a user equipment, information about a measurement set of K (K<=N) component carriers on which measurement is performed, from among N component carriers, from a base station,
    wherein the information further includes a report configuration for the measurement set of K component carriers;
    performing, by the user equipment, a measurement on the K component carriers based on the received information; and
    reporting, by a user equipment, a measurement result for the K component carriers to the base station if the measurement result satisfies a report condition included in the report configuration,
    wherein each respective component carrier is defined by a respective center frequency,
    wherein center frequencies of the K component carriers do not overlap with center frequencies of component carriers assigned to the user equipment,
    wherein the measurement set is received though a Radio Resource Control (RRC) message, and the measurement set is changed through a Physical Downlink Control Channel (PDCCH),
    wherein the measurement set is a cell-specific measurement set that is applied to all user equipment within in a specific cell,
    wherein the measurement set is received together with carrier assignment information and carrier activation information,
    wherein the measurement set is a subset of a cell component carrier (CC) set,
    wherein the measurement set is included in downlink control information (DCI) on the PDCCH,
    wherein a parameter identifying the measurement set is masked in a Cyclic Redundancy Check (CRC) of the DCI, and
    wherein the measurement set is only received in a subframe in which a primary synchronization signal (PSS) and a secondary synchronization signal (SSS) are received.

2. The method of claim 1, wherein the information about the measurement set is received in response to a request for a change of the measurement set of the user equipment.

3. The method of claim 1, wherein the measurement set is further received through a reference component carrier.

4. The method of claim 1, wherein the measurement set is further received in a control region of a subframe.

5. The method of claim 4, wherein the measurement set is further received in one or more predetermined Control Channel Elements (CCEs) among CCEs within the control region.

6. The method of claim 1, wherein the measurement set is received in a predetermined period.

7. A user equipment for reporting a measurement in a wireless communication system, comprising:
    a measurement unit configured to perform a measurement on K (K<=N) component carriers based on information about a measurement set of the K component carriers on which measurement is performed, from among N component carriers; and
    a transceiver configured to receive the information about the measurement set from a base station and report a measurement result of the K component carriers to the base station,
    wherein the information further includes a report configuration for the measurement set of K component carriers, wherein the measurement result is reported to the base station if the measurement result satisfies a report condition included in the report configuration, wherein each respective component carrier is defined by a respective center frequency, wherein center frequencies of the K component carriers do not overlap with center frequencies of component carriers assigned to the user equipment, wherein the measurement set is received though a Radio Resource Control (RRC) message, and the measurement set is changed through a Physical Downlink Control Channel (PDCCH), wherein the measurement set is a cell-specific measurement set that is applied to all user equipment within in a specific cell, wherein the measurement set is received together with carrier assignment information and carrier activation information, wherein the measurement set is a subset of a cell component carrier (CC) set, wherein the measurement set is included in downlink control information (DCI) on the PDCCH, wherein a parameter identifying the measurement set is masked in a Cyclic Redundancy Check (CRC) of the DCI, and wherein the measurement set is only received in a subframe in which a primary synchronization signal (PSS) and a secondary synchronization signal (SSS) are received.

\* \* \* \* \*